US 6,574,077 B1

United States Patent
Crane et al.

(10) Patent No.: US 6,574,077 B1
(45) Date of Patent: Jun. 3, 2003

(54) MICROACTUATOR ASSEMBLY HAVING IMPROVED STANDOFF CONFIGURATION

(75) Inventors: Peter Crane, Richfield, MN (US); Bruce C. Polson, Savage, MN (US); Roger L. Hipwell, Jr., Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 107 days.

(21) Appl. No.: 09/587,312

(22) Filed: Jun. 5, 2000

Related U.S. Application Data (60) Provisional application No. 60/168,851, filed on Dec. 2, 1999.

(51) Int. Cl.$^7$ .............................. G11B 21/24; G11B 5/56
(52) U.S. Cl. ..................................................... 360/294.3
(58) Field of Search ................................ 360/294, 290, 360/86, 274, 294.5, 294.3, 294.1

(56) References Cited

U.S. PATENT DOCUMENTS

| | | | |
|---|---|---|---|
| 3,924,268 A | 12/1975 | McIntosh et al. | ............. 360/78 |
| 4,374,402 A | 2/1983 | Blessom et al. | |
| 4,419,714 A | 12/1983 | Locke | ......................... 361/321 |
| 4,651,242 A | 3/1987 | Hirano et al. | |
| 4,764,829 A | 8/1988 | Makino | ....................... 360/294 |
| 4,914,725 A | 4/1990 | Belser et al. | ................ 318/560 |
| 5,021,906 A | 6/1991 | Chang et al. | ............ 360/235.1 |
| 5,034,828 A | 7/1991 | Ananth et al. | ................. 360/75 |
| 5,177,652 A | 1/1993 | Yamaguchi et al. | ..... 360/78.05 |
| 5,189,578 A | 2/1993 | Mori et al. | ............... 360/294.6 |
| 5,206,983 A | 5/1993 | Guckel et al. | ................. 29/598 |
| 5,220,200 A | 6/1993 | Blanton | ....................... 257/778 |
| 5,303,105 A | 4/1994 | Jorgenson | ................ 360/294.3 |
| 5,327,033 A | 7/1994 | Guckel et al. | ......... 310/40 MM |
| 5,364,742 A | 11/1994 | Fan et al. | .................... 430/317 |
| 5,375,033 A | 12/1994 | MacDonald | ................ 361/281 |

(List continued on next page.)

FOREIGN PATENT DOCUMENTS

| | | |
|---|---|---|
| EP | 0 412 221 B1 | 11/1989 |
| JP | 63-122069 | 5/1988 |
| JP | 02-263369 | 4/1989 |
| JP | 04-134681 | 5/1992 |

(List continued on next page.)

OTHER PUBLICATIONS

Crane et al, Dec. 20, 2001, US PAP 2001/0053050 A1.*
Hipwell, Jr. et al, Dec. 6, 2001, US PAP 2001/0048577 A1.*
"Silicon Micromachined Electromagnetic Microactuators for Rigid Disk Drives" by Tang et al, *IEEE Transactions on Magnetics*, vol. 31, No. 6, Nov. 1995.

(List continued on next page.)

*Primary Examiner*—Robert S. Tupper
*Assistant Examiner*—Julie Anne Watko
(74) *Attorney, Agent, or Firm*—Kinney & Lange, P.A.

(57) ABSTRACT

A disc drive system includes a recording disc rotatable about an axis, a slider carrying a transducing head for transducing data with the disc, an a dual-stage actuation assembly supporting the slider for positioning the transducing head adjacent a selected radial track of the disc. The dual-stage actuation assembly includes a coarsely movable support structure and a microactuator. The microactuator includes a microactuator frame attached to the support structure which includes a stator and a rotor. The rotor is operatively attached to the slider an is movable with respect to the stator in a first horizontal plane parallel to the surface of the disc. A magnetic circuit is arranged to move the microactuator rotor and the slider in the first horizontal plane generally parallel to the surface of the disc, the circuit being partially formed on the microactuator frame and partially formed on the support structure. A plurality of standoffs are provided on the microactuator frame to precisely space the microactuator frame from the support structure.

16 Claims, 7 Drawing Sheets

U.S. PATENT DOCUMENTS

| | | | |
|---|---|---|---|
| 5,436,996 A | 7/1995 | Tabasky et al. | 385/89 |
| 5,491,597 A | 2/1996 | Bennin et al. | 360/245.9 |
| 5,521,778 A | 5/1996 | Boutaghou | 360/264.5 |
| 5,592,037 A | 1/1997 | Sickafus | 310/40 MM |
| 5,645,735 A | 7/1997 | Bennin et al. | 216/22 |
| 5,646,464 A | 7/1997 | Sickafus | 310/40 MM |
| 5,657,188 A | 8/1997 | Jurgenson et al. | 360/294.3 |
| 5,658,636 A | 8/1997 | Reed et al. | 428/88 |
| 5,665,249 A | 9/1997 | Burke et al. | 216/2 |
| 5,745,319 A | 4/1998 | Takekado et al. | 360/78.05 |
| 5,764,444 A | 6/1998 | Imamura et al. | 360/294.4 |
| 5,772,902 A | 6/1998 | Reed et al. | 216/2 |
| 5,781,381 A | 7/1998 | Koganezawa et al. | 360/294.3 |
| 5,796,558 A | 8/1998 | Hanrahan et al. | 360/294.6 |
| 5,801,472 A | 9/1998 | Wada et al. | 310/309 |
| 5,805,375 A | 9/1998 | Fan et al. | 360/78.12 |
| 5,805,427 A | 9/1998 | Hoffman | 361/770 |
| 5,829,127 A | 11/1998 | Hagner | 29/846 |
| 5,834,334 A | 11/1998 | Leedy | 438/107 |
| 5,840,593 A | 11/1998 | Leedy | 438/6 |
| 5,852,460 A | 12/1998 | Schaeffer et al. | 347/87 |
| 5,856,896 A | 1/1999 | Berg et al. | 360/245.3 |
| 5,867,347 A | 2/1999 | Knight et al. | 360/294.5 |
| 5,869,354 A | 2/1999 | Leedy | 438/110 |
| 5,896,246 A | 4/1999 | Budde et al. | 360/244.4 |
| 5,898,541 A | 4/1999 | Boutaghou et al. | 360/294.4 |
| 5,898,544 A | 4/1999 | Krinke et al. | 360/264.5 |
| 5,910,010 A | 6/1999 | Nishizawa et al. | 438/15 |
| 5,920,441 A | 7/1999 | Cunningham et al. | 360/78.05 |
| 5,936,805 A | 8/1999 | Imaino | 360/294.5 |
| 5,938,106 A | 8/1999 | Pierson | 228/246 |
| 5,943,155 A | 8/1999 | Goossen | 359/247 |
| 5,946,559 A | 8/1999 | Leedy | 438/157 |
| 5,949,571 A | 9/1999 | Goossen et al. | 359/291 |
| 5,955,659 A | 9/1999 | Gupta et al. | 73/54.01 |
| 5,955,817 A | 9/1999 | Dhuler et al. | 310/307 |
| 5,959,376 A | 9/1999 | Allen | 310/40 MM |
| 5,959,808 A | 9/1999 | Fan et al. | 360/294.3 |
| 6,038,104 A * | 3/2000 | Sato et al. | 360/294.3 |
| 6,157,521 A * | 12/2000 | Utsunomiya | 360/294.5 |
| 6,198,606 B1 * | 3/2001 | Boutaghou et al. | 360/294.3 |
| 6,201,667 B1 * | 3/2001 | Yamamoto et al. | 360/264.2 |
| 6,295,185 B1 * | 9/2001 | Stefansky | 360/294.5 |

FOREIGN PATENT DOCUMENTS

| | | |
|---|---|---|
| JP | 04-368676 | 12/1992 |
| JP | 05-094682 | 4/1993 |
| JP | 06-020412 | 1/1994 |
| JP | 07-085621 | 3/1995 |

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

* cited by examiner

MICROACTUATOR ASSEMBLY HAVING IMPROVED STANDOFF CONFIGURATION

CROSS-REFERENCE TO RELATED APPLICATION(S)

This application claims priority from U.S. Provisional Application No. 60/168,851 filed Dec. 2, 1999 for "MEMS Assembly Having Standoffs Formed As Dam Structures And Through Etched Solder Wells" by P. Crane, B. Polson and R. Hipwell, Jr.

BACKGROUND OF THE INVENTION

The present invention relates to a disc drive microactuator, and more particularly to improved spacing methods for use in a magnetic microactuator utilizing a vertical magnetic circuit contained on a substrate and a coil structure to provide microactuation force.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising approach for high resolution head positioning involves employing a high resolution microactuator in addition to the conventional lower resolution actuator motor, thereby effecting head positioning through dual-stage actuation. Various microactuator designs have been considered to accomplish high resolution head positioning. One design involves inserting a silicon-based thin film structure between the suspension and the slider in a disc drive assembly. A major technical challenge in implementing such a microactuator is to provide sufficiently large actuation force to overcome spring bias forces to drive the head at a speed high enough to accommodate the required bandwidth. Such a design must be realized in a relatively small wafer area, to keep costs reasonable and to allow easy integration into the disc drive design.

Therefore, there is a need in the art for a microactuator design providing large actuation force with reasonable power consumption and within a reasonable wafer area to microposition a transducing head at a speed that accommodates the high bandwidth required by high performance disc drives. Designs for achieving this goal are disclosed in U.S. application Ser. No. 09/315,006, filed May 19, 1999 for "Magnetic Microactuator" by P. Crane, W. Bonin and B. Zhang, and in U.S. application Ser. No. 09/490,421 filed Jan. 24, 2000 for "Coil Structures For Magnetic Microactuator" by P. Crane, W. Bonin and Z. Boutaghou, both of which are hereby incorporated by reference. Additional improvements to such a design are desirable to further advance the state of the art.

BRIEF SUMMARY OF THE INVENTION

The present invention is an improved standoff design for a disc drive system employing a microactuator. The disc drive system includes a recording disc rotatable about an axis, a slider carrying a transducing head for transducing data with the disc, and a dual-stage actuation assembly supporting the slider for positioning the transducing head adjacent a selected radial track of the disc. The dual-stage actuation assembly includes a coarsely movable support structure and a microactuator. The microactuator includes a microactuator frame attached to the support structure which includes a stator and a rotor. The rotor is operatively attached to the slider and is movable with respect to the stator in a first horizontal plane parallel to the surface of the disc. A magnetic circuit is arranged to move the microactuator rotor and the slider in the first horizontal plane generally parallel to the surface of the disc, the circuit being partially formed on the microactuator frame and partially formed on the support structure. A plurality of standoffs are provided on the microactuator frame to precisely space the microactuator frame from the support structure. The standoffs are designed to control the flow of bonding agent to direct overflow in a predefined path that will not damage the microactuator, so that a consistent, precise spacing is achievable between the microactuator frame and the support structure.

DETAILED DESCRIPTION

Figure 1:
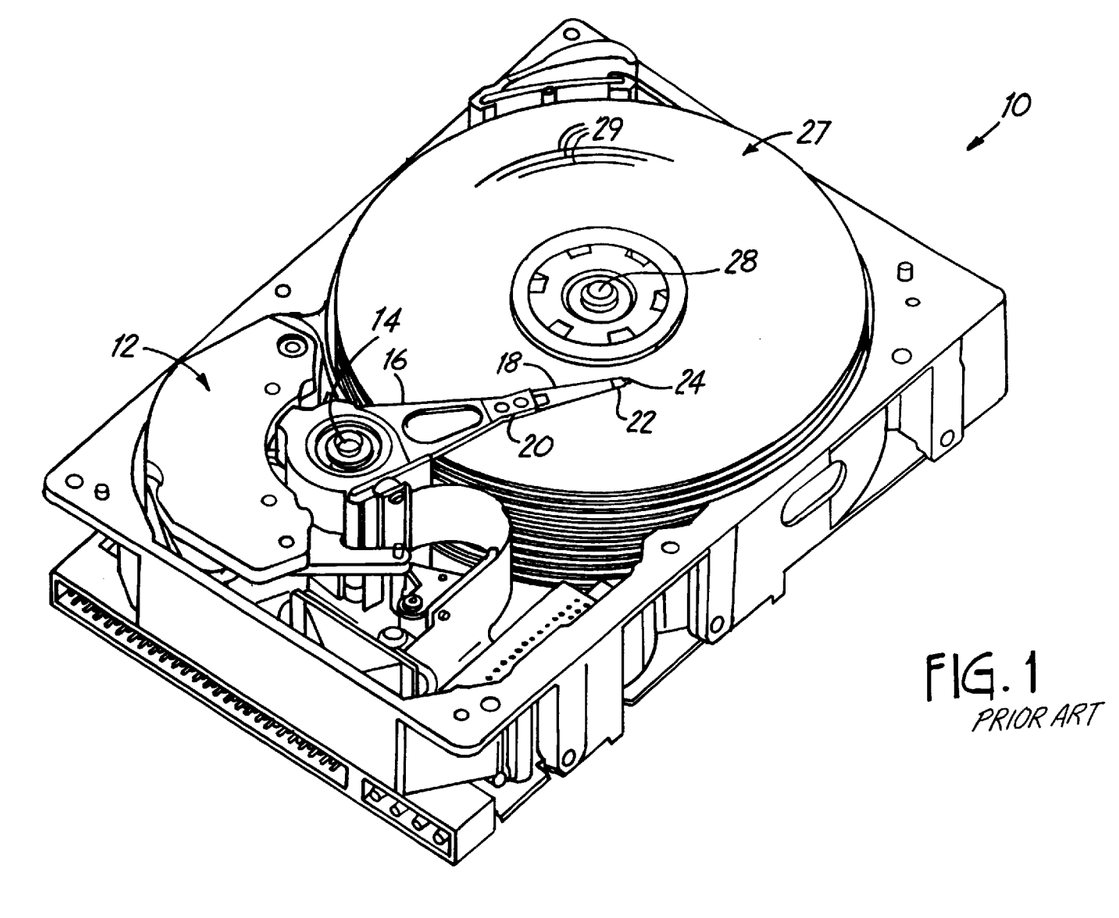
FIG. 1 is a perspective view of a prior art disc drive actuation system for positioning a slider over tracks of a disc.

FIG. 1 is a perspective view of a prior art disc drive actuation system 10. Actuation system 10 includes voice coil motor (VCM) 12 arranged to rotate actuator arm 16 on a spindle around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on disc 27, which rotates around axis 28 and includes concentric tracks 29 on which the data is written. As disc 27 rotates, windage is encountered by slider 24 to keep it aloft a small distance above the surface of disc 27.

VCM 12 is selectively operated to move actuator arm 16 around axis 14, thereby moving slider 24 between tracks 29 of disc 27. However, for disc drive systems with high track density, VCM 12 lacks sufficient resolution and frequency response to position a transducing head on slider 24 precisely over a selected track of disc 27. Therefore, a higher resolution actuation device is necessary.

Figure 2:
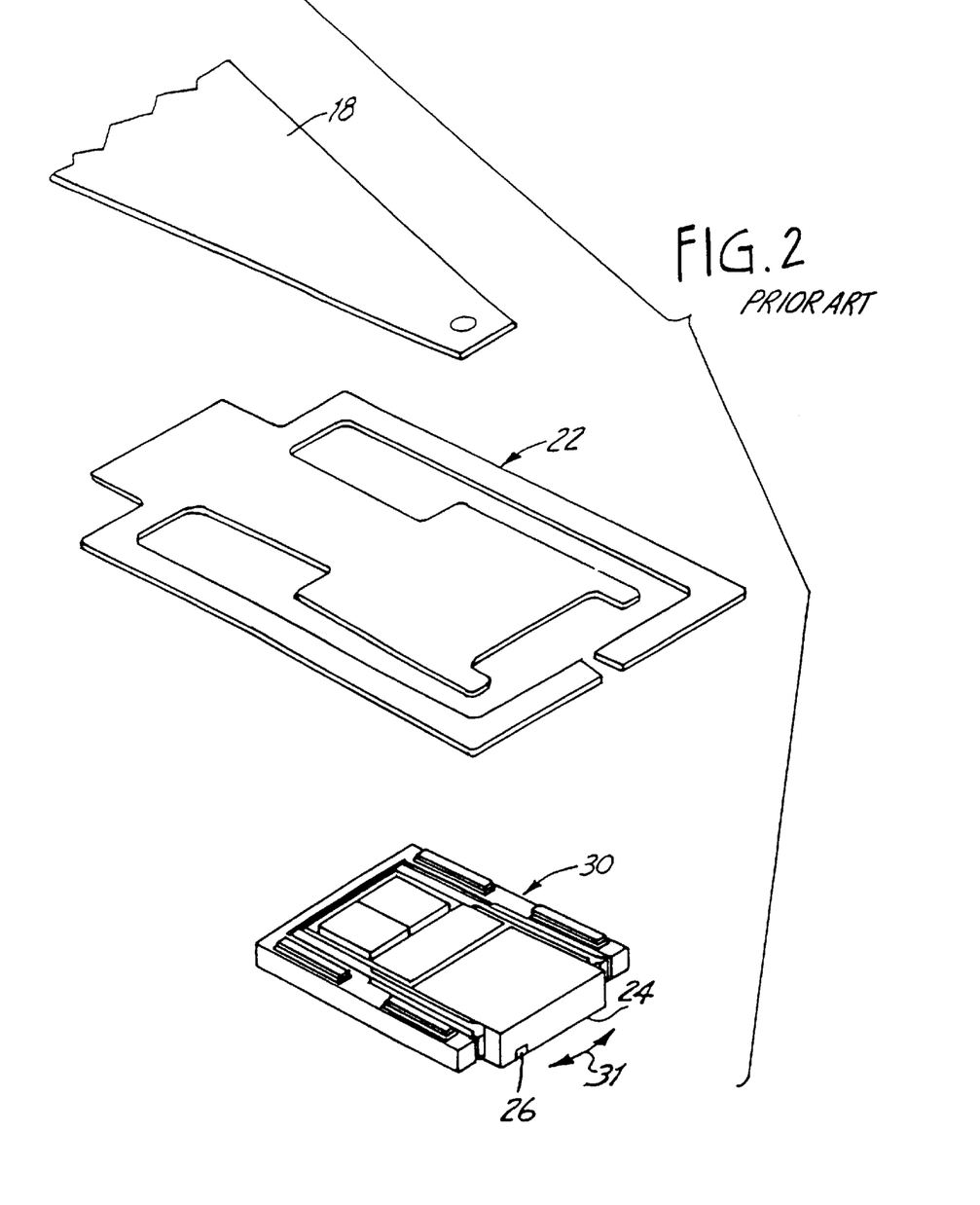
FIG. 2 is an exploded perspective view of a portion of a prior art disc drive including a microactuator according to the present invention.

FIG. 2 is an exploded perspective view of a portion of a prior art disc drive including microactuator 30 for high resolution head positioning. Flexure 22 is attached to load beam 18, and microactuator 30 is attached to flexure 22 to carry slider 24 above a surface of disc 27 (FIG. 1). Transducing head 26 is carried by slider 24 to transduce data with the disc.

In operation of the disc drive, load beam 18, flexure 22 and microactuator 30 carrying slider 24 are all moved together as coarse positioning is performed by VCM 12 (FIG. 1) moving actuator arm 16 (FIG. 1). To achieve fine positioning of transducing head 26, microactuator 30 generates a force which causes bending of the beam springs of the microactuator. As a result, the portion of microactuator 30 carrying slider 24 moves slightly with respect to flexure 22 in the direction of arrows 31, displacing transducing head 26 with high resolution for precise positioning over a selected track of the disc.

Figure 3:
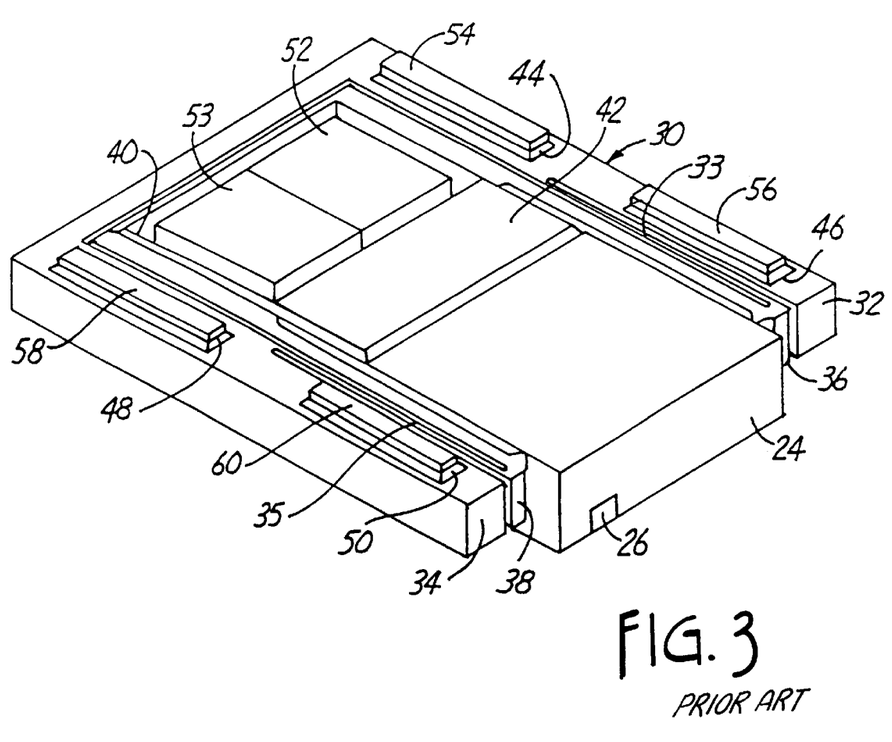
FIG. 3 is a perspective view of a prior art microactuator system for positioning a slider over tracks of a disc.

FIG. 3 is a perspective view of prior art microactuator 30 for use in a disc drive system. Microactuator 30 includes outer preloading bars 32 and 34 and inner alignment clips 36 and 38, with inner alignment clips 36 and 38 clamping against the sides of slider 24 at a frontal portion (to the right in FIG. 3) thereof. Flexible beam springs 33 and 35 extend between the proximal ends of preloading bars 32 and 34 and the distal ends of alignment clips 36 and 38. Tub 40 having a bottom surface lined with a ferromagnetic keeper material is formed in the substrate of microactuator 30 opposite transducing head 26 of slider 24, and structural bond pad 42 is provided for attachment to the top surface (opposite the air-bearing surface) of slider 24. Magnets 52 and 53 are located in tub 40, attached to the ferromagnetic lining on the bottom surface of tub 40. Standoffs 54, 56, 58 and 60 are formed on respective standoff bases 44, 46, 48 and 50 on outer preloading bars 32 and 34, to be borne upon so as to apply pre-load force to microactuator 30 as it supports slider 24 over the surface of the disc. In an exemplary configuration, microactuator 30 has an outer perimeter of about 2195 by 1600 by 200 microns. The details of the construction and operation of microactuator 30 are disclosed in U.S. application Ser. No. 09/315,006, which has been incorporated herein by reference.

Prior art microactuator 30 shown in FIG. 3 utilized standoffs 54, 56, 58 and 60 that were columns formed of a solid material that is integral with microactuator 30, with a thin layer of a bonding agent, such as solder or another type of adhesive, on the top of the column. Thus, the spacing between components on flexure 22 (FIG. 2) and components on microactuator 30 was controlled by the thickness of the bonding agent layer on the standoff column. Also, the thin layer of bonding agent had the potential to fail under high thermal stress. Since microactuator 30 is typically formed of a material such as silicon, which has a thermal expansion coefficient of 2.3 parts-per-million per degree (ppm/° C.), and the top keeper of the coil assembly is a ferritic stainless steel material having a thermal expansion coefficient of 17.3 ppm/° C., a thermal mismatch occurs which stresses the solder joint, and could potentially result in failure of the joint. Excess bonding agent could also potentially flow off of the top of the standoff column between beam springs 33 and 35 and preloading bars 32 and 34, which locks the motion of microactuator 30. Therefore, a modified standoff design is desirable to alleviate these potential difficulties, and to build additional safeguards into the process of forming and attaching the microactuator, streamlining the manufacturing process and improving the yield of usable devices.

Figure 4:
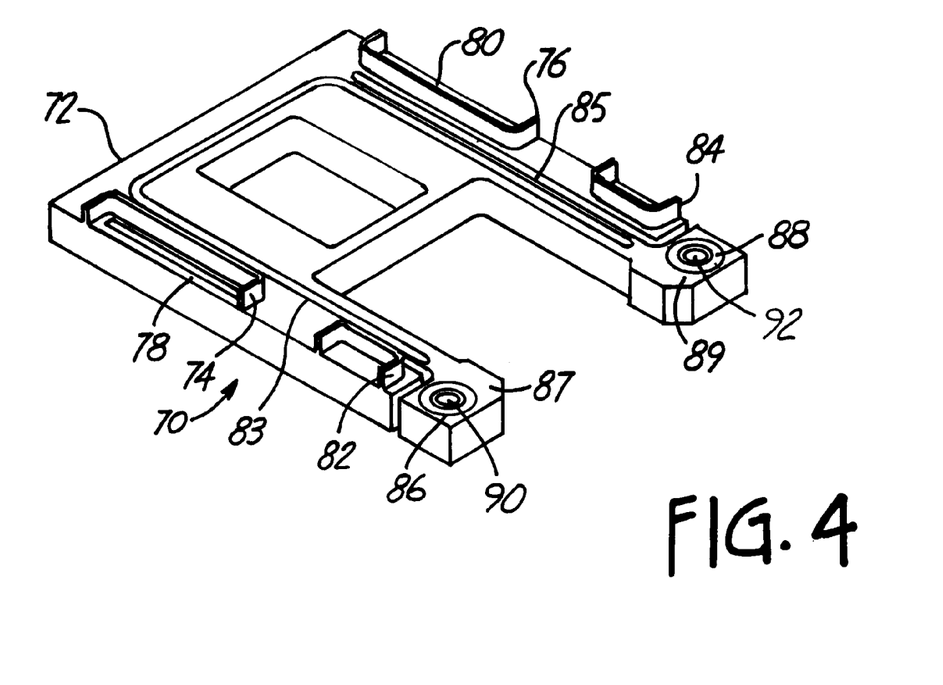
FIG. 4 is a perspective view of a microactuator frame utilizing an improved standoff design according to the present invention.

FIG. 4 is a perspective view of microactuator assembly 70 according to the present invention. Microactuator assembly 70 utilizes standoff dams 74 and 76 to control the spacing between microactuator frame 72 and components bonded thereon. Bonding pads 78 and 80 are located on microactuator frame 72 bounded by standoff dams 74 and 76, to guard the structure from overflow of bonding agent or variable thicknesses of the bondline. Excess bonding agent flows out the side of the microactuator, where it may be easily cleaned off and does not pose a risk of collecting between the microactuator beams and locking the motion of the microactuator. With this configuration, a large solder thickness, up to 100 micrometers ($\mu$m) in one embodiment, may be used to bond microactuator frame 72 to other components without impacting the consistency or part-to-part variability of the air gap thickness of the magnetic circuit of the microactuator. As a result, the bondline has improved ability to withstand thermal stress without failing. Similar standoff dams 82 and 84 are provided on the rotor portion of microactuator frame 72 for connection to a support structure such as a stainless steel suspension gimbal. Flex circuit bonding pads 86 and 88 are provided on the rotor of microactuator 70, and are annular with respective drain holes 90 and 92 in the centers thereof, etched completely through the microactuator wafer. Thus, a consistently small bondline thickness can be maintained, determined by the surface tension of the bonding agent, with excess bonding agent building up in drain holes 90 and 92 of bonding pads 86 and 88.

Another inventive aspect of microactuator 70 is the provision of clamping support features 87 and 89 on the rotor portion of microactuator 70. In the process of assembling a disc drive system including microactuator 70, microactuator frame 72 is clamped in place by a fixture exerting forces on the sides thereof. It is undesirable for the clamping fixture to exert forces on the portion of microactuator frame 72 that are transferred to beams 83 and 85, since such forces have a tendency to crush beams 83 and 85 and therefore render microactuator 70 inoperable. By arranging the clamping fixture to exert forces on clamping support features 87 and 89 while holding microactuator 70, the forces are transmitted to the slider (not shown in FIG. 4) positioned between clamping support features 87 and 89, which is able to withstand those forces without damaging microactuator 70.

Figure 5:
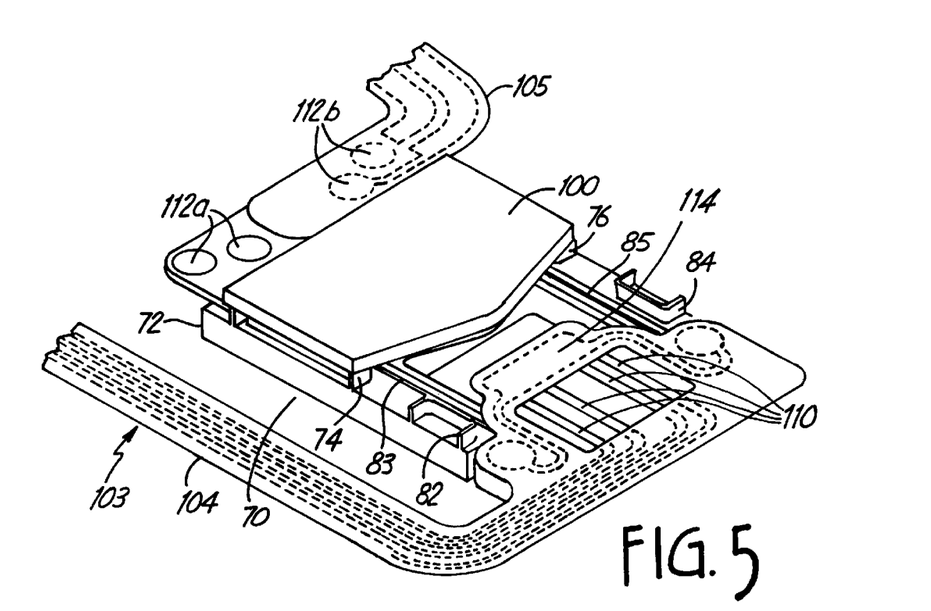
FIG. 5 is a perspective view of the microactuator frame shown in FIG. 4 having a top keeper plate and flex circuit connected thereto.

FIG. 5 is a perspective view of microactuator 70 having top keeper plate 100 carrying a magnetic coil mounted thereon. Top keeper plate 100 is formed of a ferromagnetic material, serves as a carrier structure by carrying a magnetic coil on its underside surface, and is attached to microactuator 70 on standoffs 74 and 76 by a suitable bonding method such as soldering, flowable epoxy bonding, thermoplastic adhesive bonding or the like. Microactuator 70 has a bottom ferromagnetic keeper and a pair of magnets formed thereon, as is described above with respect to FIG. 3, thereby creating a vertical magnetic circuit, partially formed on microactuator frame 72 and partially formed on top keeper plate 100, that is able to horizontally move the magnets of the microactuator and effect displacement of transducing head 26 in the direction of arrows 31 (FIG. 2). Flex circuit 103 is provided for electrical connections, with flex circuit portion 104 electrically connectable to the transducing head on the slider via flying leads 110, and flex circuit portion 105 electrically connectable to the magnetic coil carried by top keeper plate 100 at bond pads 112a and 112b. Flex circuit 103 also includes stop feature 114 for limiting vertical deflection of the slider. The details of the structure of top keeper plate 100 and the electrical connections provided by flex circuit 103 are disclosed in U.S. application Ser. No. 09/490,421, which has been incorporated by reference.

Figure 6:
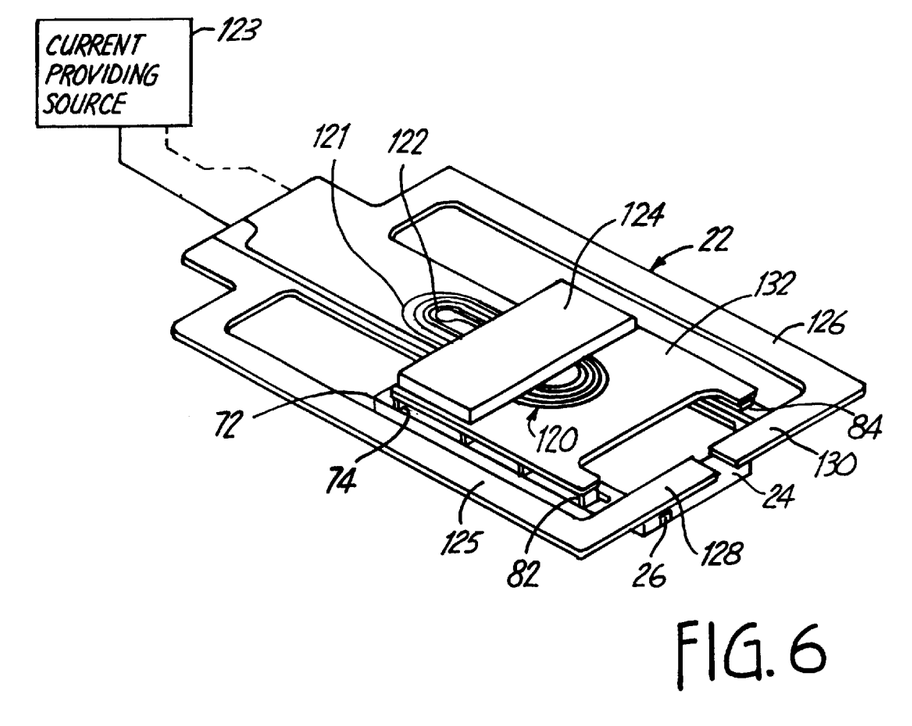
FIG. 6 is a perspective view of a microactuator frame connected to a disc drive in a first alternate configuration, employing the improved standoff design of the present invention.

FIG. 6 is a perspective view of microactuator frame 72 of the present invention attached to the underside of flexure 22 according to an alternate configuration of the disc drive. Flexure 22 includes dual-layer conductive coil 120 having top layer 121 and a bottom layer (not shown) connected through flexure 22 by a conductive via at coil region 122. Dual-layer conductive coil 120 is coupled to current providing source 123 to receive current for energizing the microactuator. Ferromagnetic keeper 124 is formed on the top surface of flexure 22 opposite the windings of dual-layer conductive coil 120, above the magnets located on microactuator frame 72. A vertically arranged magnetic circuit is thereby formed from the bottom keeper and magnets on microactuator frame 72, an airgap formed by the spacing between the magnets and dual-layer conductive coil 120, the windings of the bottom coil layer (not shown) and top coil layer 121, flexure 22 and top keeper 124. Flexure 22 serves as the carrier structure for the magnetic circuit, carrying dual-layer coil 120 and ferromagnetic keeper 124. The vertical spacing of the magnetic circuit is tightly controlled by the configuration of standoffs 74, 76, 82 and 84 according to the present invention, as was shown and described in detail above with respect to FIG. 4. The operation and characteristics of the magnetic circuit are disclosed in the aforementioned Crane et al. application. Keeper 124 maybe plated on the polyimide substrate of flexure 22 (with an insulating layer for isolating keeper 124 from top coil layer 121) or adhesively bonded thereto.

Flexure 22 is shaped to include arms 125 and 126 and cross beams 128 and 130 for supporting data leads connecting to transducing head 26 carried by slider 24, and central portion 132 for supporting dual-layer conductive coil 120 and standoffs 74, 76, 82 and 84 (shown in detail in FIG. 4). Pre-load force is applied in a preferred embodiment to central portion 132 of flexure 22 by load beam 18 (FIG. 2). The arrangement of flexure 22 and the design of microactuator frame 72 are such that operation of the microactuator by circulating current through the windings of dual-layer conductive coil 120 results in cross-track movement of slider 24 in a horizontal plane generally parallel to the surface of the disc, with the movement being permitted by the flexibility of beam springs 83 and 85 (FIG. 4). Thus, the cross-track (radial) position of transducing head 26 is altered by the operation of the microactuator, for high resolution positioning with respect to a selected track of the disc adjacent slider 24.

Figure 7:
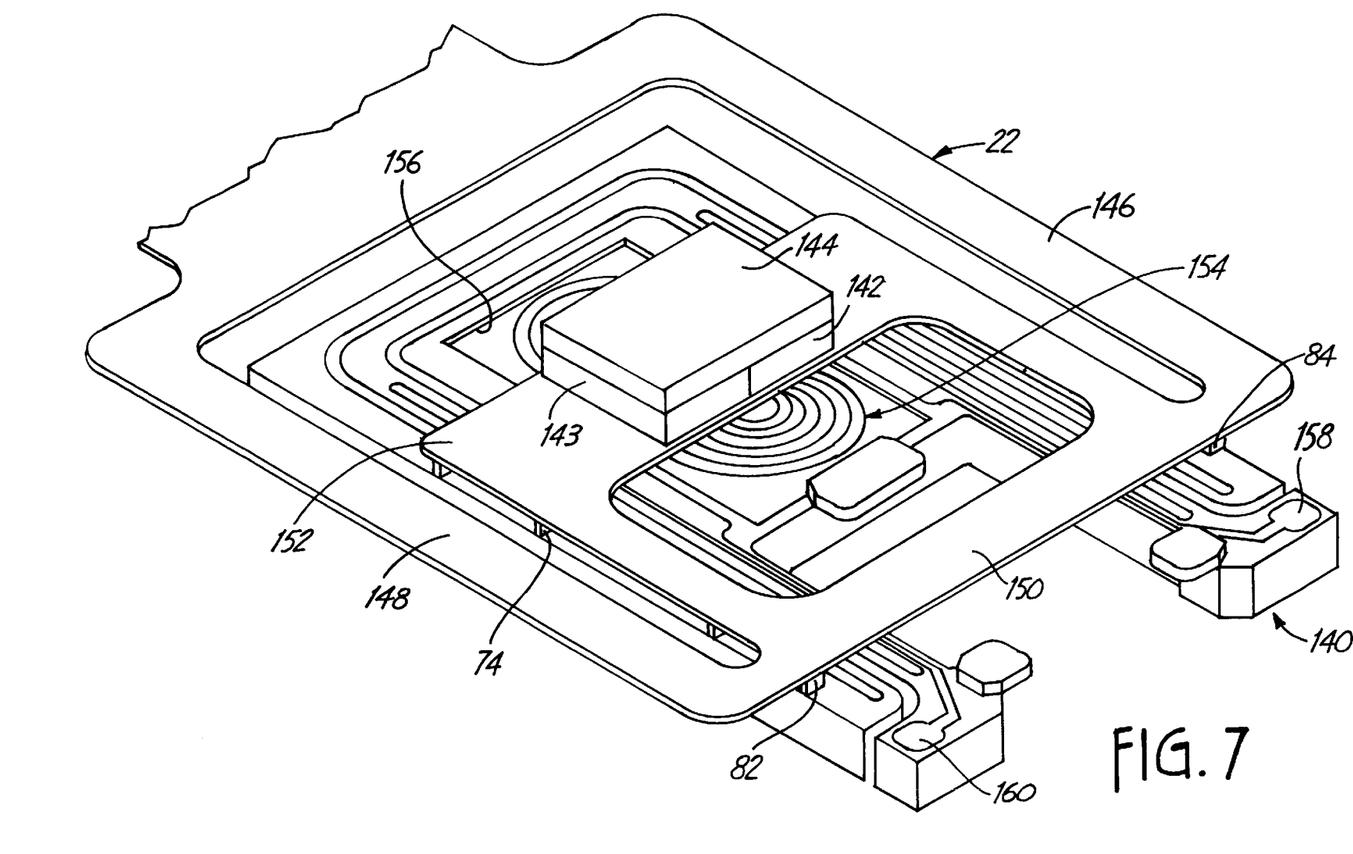
FIG. 7 is a perspective view of a microactuator frame connected to a disc drive in a second alternate configuration, employing the improved standoff design of the present invention.

FIG. 7 is a perspective view of microactuator frame 140 having flexure 22 suspended thereabove to carry magnets 142 and 143 and top ferromagnetic keeper 144 and to provide preloading force to standoffs 74, 76 (FIG. 4), 82 and 84 on microactuator frame 140. Flexure 22 is shaped to include arms 146 and 148 and cross beam 150 therebetween at a distal end of flexure 22. Central bridge portion 152 is located in the aperture between arms 146 and 148 and cross beam 150, with a platform directly above dual-layer coil 154, and bears upon standoffs 74, 76 (FIG. 4), 82 and 84 to apply preloading force to microactuator frame 140. Magnets 142 and 143 are attached to bridge portion 152 of flexure 22 above dual-layer coil 154, and top ferromagnetic keeper 144 is formed on top of magnets 142 and 143 to complete the vertical magnetic circuit of bottom ferromagnetic keeper 156, dual-layer coil 154, magnets 142 and 143 and top ferromagnetic keeper 144. Flexure 22 serves as the carrier structure for the magnetic circuit, carrying dual-layer coil 154, magnets 142 and 143 and top ferromagnetic keeper 144. In the embodiment shown in FIG. 7, magnets 142 and 143 are fixed and dual-layer coil 154 on bottom ferromagnetic keeper 156 moves laterally in response to a current applied at bond pads 158 and 160 to flow through dual-layer coil 154, thereby effecting movement of the slider-supporting portion of microactuator frame 140 to radially position the transducing head carried by the slider.

Figure 8:
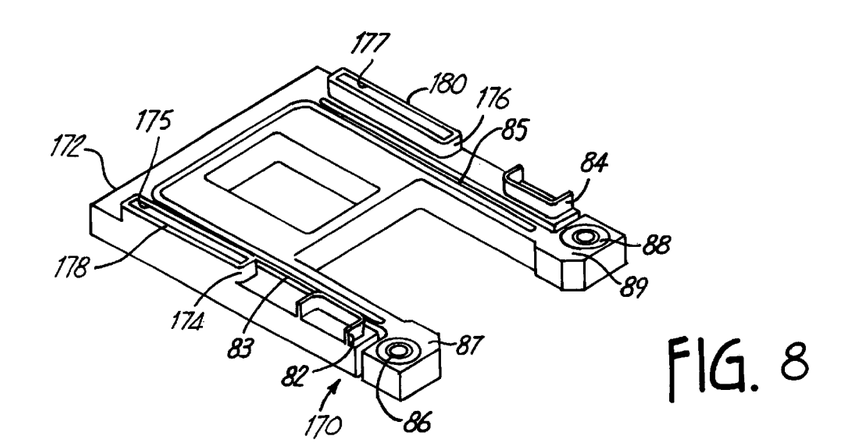
FIG. 8 is a perspective view of a microactuator frame according to an alternate embodiment of the present invention.

FIG. 8 is a perspective view of microactuator assembly 170 according to an alternate embodiment of the present invention. Microactuator assembly 170 includes microactuator frame 172 utilizing modified standoff structures 174 and 176 for bonding microactuator frame 172 to the components of a disc drive system. Standoff structures 174 and 176 include apertures inside the perimeter of bonding pads 178 and 180 extending completely through microactuator frame 172 to form conduits 175 and 177 for the flow of bonding agent. This embodiment is preferable for a situation in which difficulty is encountered applying a sufficient thickness of bonding agent to form a thick bondline between microactuator 170 and top keeper plate 100 (FIG. 5) or flexure 22 (FIGS. 6 and 7). The variability in bondline thickness is further reduced by the provision of conduits 175 and 177 through microactuator frame 172 for overflow of bonding agent. Conduits 175 and 177 may also be used for the application of bonding agent from the bottom side of microactuator frame 172. Bonding agent wicks through microactuator frame 172 into the joint area with top keeper 100 (FIG. 5) or flexure 22 (FIGS. 6 and 7) in place on bonding pads 178 and 180, ensuring a thick region of bonding agent making the connection while preventing any variations in the spacing between microactuator frame 172 and top keeper plate 100 or flexure 22.

The present invention therefore provides an improved standoff design for connecting a microactuator assembly in a disc drive system with a consistent, controlled spacing. By precisely controlling the spacing of the microactuator components, the potential variability of microactuator strokes among multiple manufactured devices is reduced or eliminated. This enables more precise head positioning to be achieved by the microactuator. In addition, the control of bonding agent overflow achieved by the standoff design of the present invention reduces the number of devices that are damaged or rendered inoperable by bonding agent collecting between the beam springs of the microactuator. The thick bondline enabled by the standoff design of the present invention also prevents failure due to thermal strain during operation of the microactuator.

Although the present invention has been described with reference to preferred embodiments, workers skilled in the art will recognize that changes may be made in form and detail without departing from the spirit and scope of the invention.

What is claimed is:

1. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly including a coarsely movable support structure and a microactuator, the microactuator comprising:

a microactuator frame attached to the support structure with a bonding agent, the microactuator frame including a stator and a rotor, the rotor being operatively attached to the slider and being movable with respect to the stator in a first horizontal plane parallel to a surface of the disc; and a plurality of standoffs on the microactuator frame to space the microactuator frame from the coarsely movable support structure, wherein the spacing is determined by a height of each of the plurality of standoffs and a consistent thickness of the bonding agent determined by a surface tension of the bonding agent.

2. The disk drive of claim 1, wherein the microactuator further comprises:

a magnetic circuit arranged vertically in a plurality of planes substantially parallel to the first horizontal plane to move the microactuator rotor and the slider in the first horizontal plane generally parallel to the surface of the disc, the magnetic circuit being partially formed on the microactuator frame and partially formed on a carrier structure.

3. The disc drive of claim 2, wherein the microactuator further comprises fixture clamping support features on the microactuator rotor for transferring lateral clamping forces applied to the microactuator to the slider.

4. The disc drive of claim 2, wherein the support structure includes a flex circuit for electrical connection to the magnetic circuit and the transducing head carried by the slider.

5. The disc drive of claim 4, wherein the flex circuit further connects to the microactuator rotor.

6. The disc drive of claim 5, wherein the flex circuit includes a stop feature for limiting vertical deflection of the slider.

7. The disc drive of claim 2, wherein the magnetic circuit comprises:

a first ferromagnetic keeper on the microactuator rotor;

a plurality of magnets on the first ferromagnetic keeper;

a coil confronting the plurality of magnets, the coil being vertically spaced from the magnets by a predetermined gap distance; and a second ferromagnetic keeper arranged so that the coil is between the plurality of magnets and the second ferromagnetic keeper.

8. The disc drive of claim 7, wherein the second ferromagnetic keeper is a keeper plate supporting the coil there below.

9. The disc drive of claim 8, wherein the keeper plate is attached to the microactuator frame and is spaced from the microactuator frame by a distance determined by a height of the plurality of standoffs.

10. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly including a coarsely movable support structure and a microactuator, the microactuator comprising:

a microactuator frame attached to the support structure, the microactuator frame including a stator and a rotor, the rotor being operatively attached to the slider and being movable with respect to the stator in a first horizontal plane parallel to the surface of the disc;

a magnetic circuit arranged vertically in a plurality of planes substantially parallel to the first horizontal plane to move the microactuator rotor and the slider in the first horizontal plane generally parallel to the surface of the disc, the magnetic circuit being partially formed on the microactuator frame and partially formed on a carrier structure; and a plurality of standoffs on the microactuator frame to space the microactuator frame from the carrier structure and from the coarsely movable support structure, wherein the plurality of standoffs each comprise a dam structure on the microactuator frame, and wherein bonding agent for attaching the microactuator frame to the carrier structure and the support structure is controlled by the dam structure to flow in a predefined overflow path away from the microactuator frame.

11. The disc drive of claim 10, wherein the bonding agent for attaching the microactuator frame to the carrier structure and the support structure forms a bondline having a thickness of up to 100 micro-meters ($\mu$m).

12. The disc drive of claim 10, wherein the bonding agent is solder.

13. The disc drive of claim 10, wherein the bonding agent is flowable epoxy adhesive.

14. The disc drive of claim 10, wherein the bonding agent is thermoplastic adhesive.

15. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly including a coarsely movable support structure and a microactuator, the microactuator comprising:

a microactuator frame attached to the support structure, the microactuator frame including a stator and a rotor, the rotor being operatively attached to the slider and being movable with respect to the stator in a first horizontal plane parallel to the surface of the disc;

a magnetic circuit arranged vertically in a plurality of planes substantially parallel to the first horizontal plane to move the microactuator rotor and the slider in the first horizontal plane generally parallel to the surface of the disc, the magnetic circuit being partially formed on the microactuator frame and partially formed on a carrier structure; and a plurality of standoffs on the microactuator frame to space the microactuator frame from the carrier structure and from the coarsely movable support structure, wherein the microactuator further comprises a plurality of annular bonding pads on the microactuator rotor each having a drain aperture extending through the microactuator rotor for attachment to a flex circuit portion of the support structure.

16. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly including a coarsely movable support structure and a microactuator, the microactuator comprising:

a microactuator frame attached to the support structure, the microactuator frame including a stator and a rotor, the rotor being operatively attached to the slider and being movable with respect to the stator in a first horizontal plane parallel to the surface of the disc;

a magnetic circuit arranged vertically in a plurality of planes substantially parallel to the first horizontal plane to move the microactuator rotor and the slider in the first horizontal plane generally parallel to the surface of the disc, the magnetic circuit being partially formed on the microactuator frame and partially formed on a carrier structure; and a plurality of standoffs on the microactuator frame to space the microactuator frame from the carrier structure and from the coarsely movable support structure, wherein the microactuator further comprises a plurality of annular bonding pads on the microactuator rotor each having a drain aperture extending through the microactuator rotor for attachment to a flex circuit portion of the support structure, wherein the plurality of standoffs each comprise a bonding pad and an aperture inside a perimeter of the bonding pad extending through the microactuator frame.

* * * * *